United States Patent Office 3,531,303
Patented Sept. 29, 1970

3,531,303
ALKALINE EARTH ALUMINOSILICATE GLASS-CERAMIC ARTICLES
Dov Bahat, Corning, N.Y., assignor to Corning Glass Works, Corning, N.Y., a corporation of New York
No Drawing. Filed May 22, 1967, Ser. No. 640,364
Int. Cl. C04b 35/18
U.S. Cl. 106—39      7 Claims

ABSTRACT OF THE DISCLOSURE

This invention relates to the manufacture of glass-ceramic articles in the alkaline earth aluminosilicate composition field wherein a hexagonal alkaline earth feldspar normally constitutes the predominant crystal phase, although occasionally the triclinic form can be obtained in a substantial amount, or even as the principal crystal phase. These articles possess very high refractoriness, rendering some of them capable of service temperatures between about 1600°–1700° C., and in some instances are highly translucent, making those articles eminently useful as candidates for high temperature lamp envelopes.

---

Glass-ceramic articles are produced through the controlled crystallization of glass articles. In general, a glass-forming batch, to which a nucleating agent is commonly added, is melted and this melt cooled to a glass body. The glass body is then subjected to a heat treatment schedule which usually comprises two phases. First, the glass is heated somewhat above the transformation range of the glass to cause the development of nuclei therein. Thereafter, the nucleated glass is heated to a higher temperature, normally above the softening point of the glass, to cause the growth of crystals on the nuclei. Since the crystallization occurs on the innumerable nuclei developed during the nucleation step, the crystals are uniformly fine-grained and homogeneously dispersed in a glassy matrix. The crystals generally comprise the preponderance of the article and, therefore, endow the article with properties more similar to those of the crystal phase than those of the original glass. However, since the body is crystallized in situ from a glass, it is free of voids and non-porous. For a more complete discussion of the production of glass-ceramic articles, reference is made to U.S. Pat. No. 2,920,971.

Glass-ceramic articles have been utilized in dinnerware and culinary ware applications, in electrical components, and in deep sea diving vessels. Such a variety of uses has stemmed from the wide variance in chemical and physical properties which can be obtained in glass-ceramic articles and also from the fact that conventional glass forming methods can be employed in producing the desired shapes.

I have now discovered that certain glasses in the CaO-SoO-BaO-$Al_2O_3$-$SiO_2$ field can be nucleated and crystallized in situ to yield glass-ceramic articles which can withstand temperatures higher than 1300° C. and in some instances as high as 1600°–1700° C. without distortion and, in some compositions, can be made highly translucent. Hence, glasses consisting essentially, in weight percent on the oxide basis, of about 10–55% RO, 10–58% $Al_2O_3$, and 12–53% $SiO_2$, wherein RO consists of at least one alkaline earth metal oxide selected from the group consisting of 0–35% CaO, 0–53% SrO, and 0–55% BaO, can be nucleated with the various nucleating agents hereinafter described to yield uniformly fine-grained glass-ceramic articles normally containing a hexagonal alkaline earth feldspar as the predominant crystal phase.

Careful and detailed investigations of crystalline materials in the hexagonal alkaline earth feldspar systems have been reported by Davis and Tuttle, "Two New Crystalline Phases of the Amorthite Compositions, $CaO \cdot Al_2O_3 \cdot 2SiO_2$," Amer. J. Sci. (Bowen Volume), 107–114 (1952) and by Takeuchi, "A Detailed Investigation of the Structure of Hexagonal $BaAl_2Si_2O_8$ With Reference to Its $\alpha$–$\beta$ Inversion," Mineral. Journal, 2 (311–332). These studies have shown that in these systems the presence of either one or both hexagonal and orthorhombic unit cell forms are common and that in the barium feldspar system a transition between the two forms is temperature dependent. Therefore, it should be appreciated that reference herein to hexagonal alkaline earth feldspar reflects the possible presence of the orthorhombic modification having the same chemical composition or a mixture of the two phases.

The following materials have been found to be suitable as nucleating agents for the articles of this invention: ZnS, $V_2O_5$, $MoO_3$, $CaF_2$, $WO_3$, NiO, Au, Pt, Rh, Pd, Ir, and a combination of $Fe_2O_3$+FeO. Chemical analyses have demonstrated the presence of both FeO and $Fe_2O_3$. Operable ranges of these agents in weight percent, include 0.2–2% $Fe_2O_3$+FeO, 0.2–2% ZnS, 0.25–2% $V_2O_5$, 0.1–4% $MoO_3$, 0.5–4% $CaF_2$, 2–10% $WO_3$, and 0.1–2% NiO. The noble metals are such efficient nucleating agents that only very minute amounts are required to develop a desirable, fine-grained body. Thus, as little as 0.0008% Au, 0.0003% Pt, 0.008% Rh, 0.0008% Pd, and 0.02% Ir are operable. Much greater quantities of these materials can be utilized effectively but are unnecessary and uneconomical. Therefore, 1.0% is deemed to be a practical maximum for these agents.

Table I records glass compositions suitable in the practice of this invention. In those examples, batch ingredients in the proper proportions were ballmilled together to obtain more efficient melting and better glass homogeneity and then melted in open crucibles at 1600–1800° C. for times ranging from about 4–10 hours. The batch ingredients may be composed of any materials, either oxides or other compounds which, on being melted together, are converted to the desired oxide compositions in the proper proportions. The nucleating agents are reported as being in excess of the base glass constituents. Where the noble metals were employed as nucleating agents, they were generally added as a compound thereof, commonly a chloride, e.g., $IrCl_4$, $H_2PtCl_6$, $PdCl_2$, $RhCl_3$, and $AuCl_3$. The melts were poured into steel molds, placed into an annealer operating at about 800°–900° C., and the shapes cooled as a glass to room temperature.

TABLE I

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| $SiO_2$ | 50.0 | 47.5 | 45.0 | 35.0 | 45.0 | 43.2 | 43.2 | 43.2 | 43.2 | 43.2 | 45.2 | 30.0 | 36.9 | 37.73 | 30.0 | 40.0 | 30.0 | 25.0 |
| $Al_2O_3$ | 30.0 | 31.5 | 30.0 | 35.0 | 45.0 | 36.7 | 36.7 | 36.7 | 36.7 | 36.7 | 35.1 | 45.0 | 31.3 | 30.3 | 45.0 | 40.0 | 45.0 | 55.0 |
| BaO | | | | | | | | | | | | 25.0 | 31.8 | 31.0 | 25.0 | 20.0 | 25.0 | 20.0 |
| SrO | | | | | | | | | | | | | | | | | | |
| CaO | 20.0 | 21.0 | 25.0 | 30.0 | 10.0 | 20.0 | 20.0 | 20.0 | 20.1 | 20.1 | 19.7 | | | | | | 0.5 | 1.0 |
| $MoO_3$ | 1.0 | 1.0 | 1.0 | 1.0 | 1.0 | 1.0 | | | | | | | 2.5 | 8.3 | | | | |
| $WoO_3$ | | | | | | | | | 6.66 | 1.0 | | | | | | | | |
| $V_2O_5$ | | | | | | | | | | | | | | | | | | |
| $CaF_2$ | | | | | | | 1.0 | | | | | | | | | | | |
| Au | | | | | | | | | | | 0.8 | | | 0.68 | | | | |
| $Fe+Fe_2O_3$ | | | | | | | | 0.66 | | | | | | | 0.66 | 0.66 | | |
| ZnS | | | | | | | | | | | 0.07 | | | 0.06 | | | | |
| $TiO_2$ | | | | | | | | | | | 0.80 | | | 0.8 | | | | |
| $K_2O$ | | | | | | | | | | | 0.13 | | | 0.11 | | | | |
| $Na_2O$ | | | | | | | | | | | | | | | | | | |
| Ir | | | | | | | | | | | | | | | | | | |
| Rh | | | | | | | | | | | | | | | | | | |
| Pt | | | | | | | | | | | | | | | | | | |
| Pd | | | | | | | | | | | | | | | | | | |
| NiO | | | | | | | | | | | | | | | | | | |

| | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| $SiO_2$ | 35.0 | 50.0 | 46.7 | 20.0 | 30.0 | 36.9 | 36.9 | 36.9 | 40.0 | 36.9 | 30.0 | 30.0 | 40.0 | 35.0 | 36.9 | 36.9 | 30.0 | 40.0 |
| $Al_2O_3$ | 45.0 | 33.0 | 26.4 | 40.0 | 20.0 | 31.3 | 31.3 | 31.3 | 40.0 | 31.3 | 45.0 | 45.0 | 40.0 | 45.0 | 31.3 | 31.3 | 45.0 | 40.0 |
| BaO | | | | | | | | | | | | | | | | | | |
| SrO | 20.0 | 17.0 | 26.9 | 40.0 | 50.0 | 31.8 | 31.8 | 31.8 | 20.0 | 31.8 | 25.0 | 25.0 | 20.0 | 20.0 | 31.8 | 31.8 | 25.0 | 20.0 |
| CaO | | | | | | | | | | | | | | | | | | |
| $MoO_3$ | 0.5 | 0.5 | 1.0 | 1.0 | 1.0 | 0.5 | 0.33 | 2.0 | 0.1 | | | | | | | | | |
| $WoO_3$ | | | | | | | | | | | | | | | | | | |
| $V_2O_5$ | | | | | | | | | | 0.5 | 0.66 | | | | | | | |
| $CaF_2$ | | | | | | | | | | | | 1.5 | 3.33 | | | | | |
| Au | | | | | | | | | | | | | | 0.0017 | | | | |
| $Fe+Fe_2O_3$ | | | | | | | | | | | | | | | | | | |
| ZnS | | | | | | | | | | | | | | | | | | |
| $TiO_2$ | | | | | | | | | | | | | | | | | | |
| $K_2O$ | | | | | | | | | | | | | | | | | | |
| $Na_2O$ | | | | | | | | | | | | | | | 0.02 | 1.0 | | |
| Ir | | | | | | | | | | | | | | | | | | |
| Rh | | | | | | | | | | | | | | | | | | |
| Pt | | | | | | | | | | | | | | | | | 0.6 | |
| Pd | | | | | | | | | | | | | | | | | | 0.0003 |
| NiO | | | | | | | | | | | | | | | | | | |

| | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|
| $SiO_2$ | 46.7 | 40.0 | 36.9 | 36.9 | 15.0 | 22.0 | 22.0 | 20.0 | 30.0 | 40.0 | 45.0 | 42.0 | 45.0 | 22.0 | 32.0 | 30.0 | 32.0 | 32.0 |
| $Al_2O_3$ | 26.4 | 40.0 | 31.3 | 31.3 | 35.0 | 27.1 | 37.1 | 45.0 | 40.0 | 40.0 | 25.0 | 17.1 | 10.0 | 27.1 | 27.1 | 20.0 | 27.1 | 27.1 |
| BaO | | | | | 50.0 | 50.9 | 40.9 | 35.0 | 30.0 | 20.0 | 30.0 | 40.9 | 45.0 | 50.9 | 40.9 | 50.0 | 40.9 | 40.9 |
| SrO | 26.9 | 20.0 | 31.8 | 31.8 | | | | | | | | | | | | | | |
| CaO | | | | | | | | | | | | | | | | | | |
| $MoO_3$ | | | | | 1.0 | 1.0 | 1.0 | 1.0 | 1.7 | 1.0 | 1.0 | 1.0 | 1.0 | 1.0 | 2.0 | | | |
| $WoO_3$ | | | | | | | | | | | | | | | | 4.1 | 2.0 | 8.3 |
| $V_2O_5$ | | | | | | | | | | | | | | | | | | |
| CaF | | | | | | | | | | | | | | | | | | |
| Au | | | | | | | | | | | | | | | | | | |
| $Fe+Fe_2O_3$ | | | | | | | | | | | | | | | | | | |
| ZnS | | | | | | | | | | | | | | | | | | |
| $TiO_2$ | | | | | | | | | | | | | | | | | | |
| $K_2O$ | | | | | | | | | | | | | | | | | | |
| $Na_2O$ | | | | | | | | | | | | | | | | | | |
| Ir | | | | | | | | | | | | | | | | | | |
| Rh | | | | | | | | | | | | | | | | | | |
| Pt | 0.0065 | | | | | | | | | | | | | | | | | |
| Pd | | 0.0008 | 0.017 | | | | | | | | | | | | | | | |
| NiO | | | | 0.2 | | | | | | | | | | | | | | |

| | 55 | 56 | 57 | 48 | 59 | 60 | 61 | 62 | 63 | 64 | 65 | 66 | 67 | 68 | 69 | 70 | 71 | 72 | 73 | 74 |
|---|---|---|---|---|---|---|---|---|---|---|---|---|---|---|---|---|---|---|---|---|
| $SiO_2$ | 32.0 | 32.0 | 45.0 | 32.0 | 22.0 | 32.0 | 32.0 | 32.0 | 45.0 | 32.0 | 45.0 | 32.0 | 32.0 | 22.0 | 30.0 | 32.0 | 32.0 | 32.9 | 30 | 50 |
| $Al_2O_3$ | 27.1 | 27.1 | 25.0 | 27.1 | 27.1 | 27.1 | 27.1 | 27.1 | 25.0 | 27.1 | 25.0 | 27.1 | 27.1 | 25.8 | 20.0 | 27.1 | 27.1 | 40.6 | 40 | 30 |
| BaO | 40.9 | 40.9 | 30.0 | 40.9 | 50.9 | 40.9 | 40.9 | 40.9 | 30.0 | 40.9 | 30.0 | 40.9 | 40.9 | 50.9 | 50.0 | 40.9 | 40.9 | | | |
| SrO | | | | | | | | | | | | | | | | | | | 30 | |
| CaO | | | | | | | | | | | | | | | | | | | | 20 |
| $MoO_3$ | | | | | | | | | | | | | | | | | | | 2 | 1 |
| $WoO_3$ | | | | | | | | | | | | | | | | | | 2 | | |
| $V_2O_5$ | | | | | | | | | | | | 1.0 | 0.5 | | | | | | | |
| $CaF_2$ | | | | | | | | | | | | | 1.7 | 0.8 | | | | | | |
| Au | | | | | | | | | | | | | | | 0.0017 | 0.017 | | | 0.6 | |
| $Fe+Fe_2O_3$ | | | | | | | | | | | | | | | | | 1.0 | | | |
| ZnS | | | | | | | | | | | | | | | | | | 0.05 | | |
| $PiO_2$ | | | | | | | | | | | | | | | | | | | | |
| $K_2O$ | | | | | | | | | | | | | | | | | | 0.6 | | |
| $Na_2O$ | | | | | | | | | | | | | | | | | | 0.05 | | |
| Ir | 1.0 | 0.023 | | | | | | | | | | | | | | | | | | |
| Rh | | | 0.3 | 1.0 | | | | | | | | | | | | | | | | |
| Pt | | | | | 0.0017 | 0.17 | | | | | | | | | | | | | | |
| Pd | | | | | | 0.017 | 0.0033 | | | | | | | | | | | | | |
| NiO | | | | | | | | 0.33 | 1.0 | | | | | | | | | | | |

The glass articles shaped from melts of the compositions recorded in Table I were placed in an electric furnace and heated therein at a rate of about 5° C./minute to a temperature at which nucleation and crystallization will occur. As has been explained above, nucleation can occur at temperatures slightly higher than the transformation range of the glass. The transformation range of a glass is that temperature area within which a molten mass is deemed to have become an amorphous solid. This temperature is commonly considered to be in the vicinity of the annealing point of a glass. Therefore, with the glasses of this invention, a temperature of at least about 850° C. is required to develop substantial nuclei for the subsequent growth of crystals thereon. The highest temperature which can be utilized to produce crystals in situ is dependent upon the refractoriness of the final crystallized article. Hence, the temperature should not be so high as to cause deformation of the crystallized body. Thus, temperatures as high as 1700° C. can be employed in certain instances, e.g., Example 72, but commonly the maximum temperature utilized is about 1400° C. The glass shapes are maintained within the crystallization range for a period of time sufficient to attain the desired crystallization and then cooled to room temperature.

The rate of heating to the nucleation and crystallization range is selected to protect the glass shapes from thermal shock and deformation. The 5° C./minutes rate has been found to be satisfactory in most instances in precluding breakage due to thermal shock and excessive deformation of the glass shapes as they are being heated beyond the softening points thereof and before crystallization has progressed far enough to support the shape. The crystallization of the glass during the heat treatment proceeds more rapidly as the temperature approaches the liquidus of the crystal phase. However, as crystallization begins, the proportion of crystals to glassy matrix is very small and the article will not retain its shape if the temperature is raised too rapidly. Hence, the rate of temperature increase must be in substantial accord with the rate of crystallization. Otherwise, deformation due to a lowering of viscosity will render the final product generally of little use. Thus, I prefer to raise the temperature at a rate not exceeding about 5° C./minute in order to obtain dense, uniformly fine-grained crystallization with little, if any, deformation as the body is heated above the softening point of the glass. Nevertheless, more rapid heating rates have yielded very satisfactory crystallized articles where the shapes are relatively small or some physical support has been provided for the glass shapes.

Where more efficient and economical use of heat is desired, the heat treating may be undertaken immediately following the shaping of the glass while it is still hot, rather than cooling to room temperature and subsequently reheating. Hence, the shape may be cooled to just below the transformation range and then reheated to nucleate and crystallize it.

It can be appreciated that the time required to essentially complete crystallization is dependent upon the temperature employed for crystallization. Thus, where a temperature close to the transformation range of the glass is employed, e.g., about 800°–900° C., a relatively long period of time will be required, say about 4–8 hours, whereas, when a higher temperature, e.g., 1400° C., is employed, dwell periods as short as ¼ hour may be sufficient. However, here again, the rate of crystallization should preferably substantially balance the decrease in viscosity of the body. Longer heat treating times can be employed but with no substantial improvement in the crystallization.

Therefore, in its simplest terms, my invention comprises three steps: (1) melting a batch to yield a glass article of a particular composition; (2) simultaneously cooling the melt to some temperature at least below the transformation range of the glass and shaping an article therefrom; and (3) heat treating the glass shape between about 850°–1700° C. for a period of time sufficient to attain the desired crystallization. As noted above, higher heat treating temperatures can be employed but temperatures above about 1400° C. do not improve the crystallization and so are not economically practical.

Table II records the heat treating schedules applied to the glass shapes, the predominant crystal phase present as determined by X-ray diffraction analysis, and some modulus of rupture (p.s.i.) and coefficient of thermal expansion conducted over 25–1000° C. ($\times 10^{-7}$) measurements obtained following conventional methods. In some instances, the crystallized articles were removed directly from the heated furnace and allowed to cool in the ambient atmosphere to room temperature, while other articles were cooled to room temperature by merely cutting off the electric power to the furnace and allowing the furnace to cool at its own rate with the articles retained therein. This cooling rate was estimated to average about 2–3° C./minute.

TABLE II

| Example No. | Heating schedule | Crystal phase | Expansion coefficient | Modulus of rupture |
|---|---|---|---|---|
| 1 | 1½ hours at 960° C | Hexagonal calcium feldspar with traces of triclinic feldspar. | | |
| 2 | do | do | | |
| 3 | do | do | | |
| 4 | do | do | | |
| 5 | do | do | | |
| 6 | do | do | 74 | 15,000 |
| 7 | do | do | | |
| 8 | do | do | | |
| 9 | do | do | | |
| 10 | do | do | | |
| 11 | do | do | | |
| 12 | do | do | | |
| 13 | do | do | | |
| 14 | do | do | | |
| 15 | do | do | | |
| 16 | do | do | | |
| 17 | do | do | | |
| 18 | do | do | | |
| 19 | do | do | | |
| 20 | do | do | | |
| 21 | do | do | | |
| 22 | do | do | | |
| 23 | do | do | | |
| 24 | do | do | | |
| 25 | do | do | | |
| 26 | do | do | | |
| 27 | do | do | | |
| 28 | do | do | | |
| 29 | do | do | | |
| 30 | do | do | | |
| 31 | do | do | | |
| 32 | 1½ hours at 1,100° C | do | | |
| 33 | do | do | | |
| 34 | do | do | | |
| 35 | do | do | | |
| 36 | do | do | | |
| 37 | do | do | | |
| 38 | do | do | | |
| 39 | do | do | | |
| 40 | 1½ hours at 960° C | do | | |
| 41 | do | Hexagonal barium feldspar | | |
| 42 | do | do | | |
| 43 | do | do | | |
| 44 | do | do | | |
| 45 | do | do | | |
| 46 | do | do | | |
| 47 | do | do | | |
| 48 | do | do | | |
| 49 | do | do | | |
| 50 | do | do | | |
| 51 | do | do | | |
| 52 | do | do | | |
| 53 | do | do | | |

TABLE II—Continued

| Example No. | Heating schedule | Crystal phase | Expansion coefficient | Modulus of rupture |
|---|---|---|---|---|
| 54 | 1½ hours at 960° C | Hexagonal barium feldspar | | |
| 55 | 1½ hours at 1,100° C | do | | |
| 56 | do | do | | |
| 57 | do | do | | |
| 58 | do | do | | |
| 59 | do | do | | |
| 60 | do | do | | |
| 61 | do | do | | |
| 62 | do | do | | |
| 63 | 1½ hours at 960° C | do | | |
| 64 | do | do | | |
| 65 | do | do | | |
| 66 | do | do | | |
| 67 | do | do | | |
| 68 | do | do | | |
| 69 | 1½ hours at 1,100° C | do | | |
| 70 | do | do | | |
| 71 | 1½ hours at 960° C | do | 80 | 17,000 |
| 72 | do | do | | |
| 72 | 1½ hours at 1,700° C | do | | |
| 73 | 1½ hours at 1,050° C | Triclinic strontium feldspar | | |
| 74 | 3 hours at 1,100° C | Hexagonal calcium feldspar with substantial triclinic feldspar. | | |

Table II clearly illustrates the effectiveness of the nucleating agents in producing glass-ceramic articles wherein an alkaline earth hexagonal feldspar is normally the predominant crystal phase. Of course, where two or three of the alkaline earths are present in the glass, solid solutions of the feldspars can be formed. Although the hexagonal and/or other orthorhombic feldspar constitutes essentially all the crystal phase present, minor amounts of triclinic or monoclinic feldspars are common. In rare instances, such as is illustrated by Example 73, the triclinic form can constitute essentially the only crystal phase present. Mullite and cristobalite have also been detected in compositions having low RO contents. The crystals, themselves, are relatively uniformly fine-grained, substantially all smaller than 20 microns in diameter and, in the main, about 1 micron in diameter. Although the crystal content of the articles is dependent upon the heat treatment applied to the original glass aricles and upon the extent to which the componens of the bach are adaptable to the formation of crystal phases, it is believed that the crystal content of the body is at least and, generally, much in excess of 50% by weight, the higher crystal contents being preferred.

I have also found that solid solutions of these feldspars will be produced where $GeO_2$ is substituted in part for $SiO_2$, $Ga_2O_3$ substituted in part for $Al_2O_3$, and $Na_2O$ is substituted in part for CaO. In the cases of $GeO_2$ and $Ga_2O_3$, the ingredients can be present in amounts up to about 30% by weight. With $Na_2O$, however, the amount present should be limited to less than about 10% since the refractoriness of the glass-ceramic is deleteriously affected. Table III records several examples of glass compositions which, after being melted and shaped, were heat treated for 1½ hours at 960° C. to yield uniformly fine-grained glass-ceramic articles wherein the predominant crystal phase was a solid solution of a hexagonal alkaline earth feldspar.

TABLE III

| | 75 | 76 | 77 | 78 | 79 |
|---|---|---|---|---|---|
| $SiO_2$ | 18.3 | 44.5 | 38.9 | 48.3 | 48.3 |
| $Al_2O_3$ | 27.9 | 31.7 | 27.5 | 33.3 | 33.3 |
| BaO | 28.2 | | | | |
| $GeO_2$ | 25.6 | | | | |
| $Ga_2O_3$ | | 12.1 | 10.1 | | |
| CaO | | 11.7 | | 16.1 | 16.1 |
| SrO | | | 23.5 | | |
| $Na_2O$ | | | | 2.3 | 2.3 |
| $MoO_3$ | 1.6 | 1.6 | 1.6 | | 2.0 |
| NiO | | | | 0.3 | |

Example 75 produces a glass-ceramic article wherein the predominant crystal phase comprises a hexagonal barium feldspar solid solution with $GeO_2$. Examples 76 and 77 yield glass-ceramic articles wherein the predominant crystal phase is, respectively, a hexagonal calcium feldspar solid solution with $Ga_2O_3$, and a hexagonal strontium feldspar solid solution with $Ga_2O_3$. Examples 78 and 79 result in glass-ceramic articles having a hexagonal calcium feldspar solid solution with $Na_2O$ as the predominant crystal phase.

The above-recited ranges of $SiO_2$, $Al_2O_3$, RO, and nucleating agent have been determined to be critical in obtaining glass-ceramic articles having a hexagonal or, perhaps, a triclinic alkaline earth feldspar as substantially the only crystal phases. Various compatible metal oxides such as $K_2O$, $B_2O_3$, MgO, and $TiO_2$ may also be present in small amounts as aids in melting and forming the glass articles but such additions tend to lower the refractoriness of the product. Because of the low mobility of the alkaline earth cations, the glass-ceramic articles of this invention exhibit high electrical resistivities, e.g., a dielectric constant at room temperature at 1 kilocycle of about 7.5. Also, because of this low mobility of the alkaline earth cations, minor amounts of the alkali metal cations may be present without drastically lowering the electrical resistivity of the glass-ceramic article. Nevertheless, I prefer to include less than about 5% by weight total of the alkali oxides and less than about 10% by weight that of all compatible metal oxides.

Example 72 is my preferred composition since it provides a product having a high dielectric constant and which retains good translucency after many hours heating at 1650° C.

I claim:

1. A glass-ceramic article capable of withstanding temperatures over about 1300° C. comprising uniformly fine-grained crystals of at least one feldspar selected from the group consisting of hexagonal alkaline earth feldspar and triclinic alkaline earth feldspar homogeneously dispersed in a glassy matrix, said crystals being formed through crystallization in situ from a glass body consisting essentially, by weight on the oxide basis, of about 12–53% $SiO_2$, 10–58% $Al_2O_3$, 17–55% RO, wherein RO consists of at least one alkaline earth metal oxide selected from the group consisting of 17–50% SrO and 20–50% BaO, and at least one nucleating agent present in excess of the base glass components selected from the group consisting of about 0.2–2% $Fe_2O_3$+FeO, 0.2–2% ZnS, 0.25–2% $V_2O_5$, 0.1–4% $MoO_3$, 0.5–4% $CaF_2$, 2–10% $WO_3$, 0.1–2% NiO, 0.0008–1% Au, 0.0003–1% Pt, 0.008–1% Rh, 0.0008–1% Pd, and 0.02–1% Ir, and said glassy matrix consisting essentially of the uncrystallized portion of the glass remaining after crystallization of said crystals.

2. A glass-ceramic article according to claim 1 wherein substantially all of said crystals are less than 20 microns in diameter.

3. A glass-ceramic article according to claim 1 wherein said crystals comprise at least 50% by weight of said article.

4. A glass-ceramic article according to claim 5 wherein said base glass consists essentially of 12–53% $SiO_2$+$GeO_2$, wherein $GeO_2$ is present up to 30%, and 10–58% $Al_2O_3+Ga_2O_3$, wherein $Ga_2O_3$ is present up to 30%.

5. A method for making a glass-ceramic article capable of withstanding temperatures greater than about 1300° C. comprising the steps of:
   (a) melting a batch for a glass consisting essentially, by weight on the oxide basis, of about 12–53% $SiO_2$, 10–58% $Al_2O_3$, 17–55% RO, wherein RO consists of at least one alkaline earth metal oxide selected from the group consisting of 17–50% SrO and 20–50% BaO, and at least one nucleating agent present in excess of the base glass components selected from the group consisting of about 0.2–2% $Fe_2O_3+FeO$, 0.2–2% ZnS, 0.25–2% $V_2O_5$, 0.1–4% $MoO_3$, 0.5–4% $CaF_2$, 2–10% $WO_3$, 0.1–2% NiO, 0.0008–1% Au, 0.0003–1% Pt, 0.008–1% Rh, 0.0008–1% Pd, and 0.02–1% Ir;
   (b) simultaneously cooling the melt below the transformation range thereof and shaping a glass article therefrom;
   (c) heating said glass article to a temperature between about 850°–1700° C. for a period of time sufficient to attain crystals of at least one feldspar selected from the group consisting of hexagonal alkaline earth feldspar and triclinic alkaline earth feldspar; and then
   (d) cooling said crystallized article to room temperature.

6. A method according to claim 5 wherein the glass article is heated to a temperature between about 850°–1400° C. for about ¼–8 hours.

7. A method for making a glass-ceramic article according to claim 5 wherein said base glass consists essentially of 12–53% $SiO_2+GeO_2$, wherein $GeO_2$ is present up to 30%, and 10–58% $Al_2O_3+Ga_2O_3$, wherein $Ga_2O_3$ is present up to 30%.

References Cited

FOREIGN PATENTS 986,289    3/1965    Great Britain.

HELEN M. McCARTHY, Primary Examiner

R. D. EDMONDS, Assistant Examiner

U.S. Cl. X.R.

65—33; 106—52

UNITED STATES PATENT OFFICE
CERTIFICATE OF CORRECTION

Patent No. 3,531,303        Dated September 29, 1970

Inventor(s)  Dov Bahat

It is certified that error appears in the above-identified patent and that said Letters Patent are hereby corrected as shown below:

Column 1, line 57, "SoO" should read -- SrO --. Columns 3 and 4, Table I. the seventh constituent in each section of the Table, four occurrences, "WoO$_3$" should read -- WO$_3$ --; same Table, the eleventh constituent in each section of the table, four occurrence, "Fe + Fe$_2$O$_3$" should read -- FeO + Fe$_2$O$_3$ --; same Table, the thirteenth constituent of the fourth section, "PiO$_2$" should read -- TiO$_2$ --; same table, Examples 6, 7 and 8, the weight percent of CaO, "20.0" should read -- 20.1 --; same Table, Example 35, the weight percent of Rh, should read -- 0.6 --; the weight percent of Pt, "0.6" should read -- 0.0 --; same Table, Example 36, the weight percent of Pt, should read -- 0.003 --; the weight percent of Pd, change "0.0003" to read -- 0.0 --. Column 5, line 3, "minutes" should read -- minute --; Columns 5 and 6, Table II, Example Nos. 12 through 40, change the Crystal Phase from "Hexagonal calcium feldspar with traces of triclinic feldspar" to read -- Hexagonal Strontium Feldspar with Traces of Triclinic Feldspar --. Column 7, line 39, "bach" should read -- batch --. Column 8, line 74, "5" should read -- 1 --.

Signed and sealed this 27th day of April 1971.

(SEAL)
Attest:

EDWARD M. FLETCHER, JR.
Attesting Officer

WILLIAM E. SCHUYLER, JR.
Commissioner of Patents